(12) United States Patent
Wiley

(10) Patent No.: US 11,400,869 B2
(45) Date of Patent: Aug. 2, 2022

(54) PERSONALIZED PRODUCT MODIFICATION

(71) Applicant: TMG Performance Products, LLC, Berea, OH (US)

(72) Inventor: Scott Douglas Wiley, Medina, OH (US)

(73) Assignee: TMG PERFORMANCE PRODUCTS, Berea, OH (US)

( * ) Notice: Subject to any disclaimer, the term of this patent is extended or adjusted under 35 U.S.C. 154(b) by 373 days.

(21) Appl. No.: 16/663,897

(22) Filed: Oct. 25, 2019

(65) Prior Publication Data

US 2020/0130608 A1   Apr. 30, 2020

Related U.S. Application Data

(60) Provisional application No. 62/751,087, filed on Oct. 26, 2018.

(51) Int. Cl.
| | | |
|---|---|---|
| *B60R 13/00* | (2006.01) | |
| *F16L 55/00* | (2006.01) | |
| *B60K 13/02* | (2006.01) | |

(52) U.S. Cl.
CPC ............ *B60R 13/005* (2013.01); *B60K 13/02* (2013.01); *F16L 55/00* (2013.01)

(58) Field of Classification Search
CPC ........ B60R 13/00; B60R 13/005; B60K 13/02
See application file for complete search history.

(56) References Cited

U.S. PATENT DOCUMENTS

| | | | |
|---|---|---|---|
| 2005/0132997 A1* | 6/2005 | Vargas | F02F 7/006 123/195 C |
| 2017/0072874 A1* | 3/2017 | Hodges | F01N 13/082 |
| 2018/0056890 A1* | 3/2018 | Nola | B60R 13/0838 |
| 2020/0263641 A1* | 8/2020 | Blanks, I | F02M 35/10354 |

OTHER PUBLICATIONS

HillBank Motorsports, The Glass Mustang Hood, 2008, See EIC Search, Attached (Year: 2008).*

* cited by examiner

*Primary Examiner* — Bryon T Gyllstrom
*Assistant Examiner* — Christopher E Dunay
(74) *Attorney, Agent, or Firm* — Emerson, Thomson & Bennett, LLC; Roger D. Emerson

(57) ABSTRACT

An apparatus and method for personalized product modification is disclosed. The personalized product modification may be applied to various different types of vehicle components. For example, a lid covering may be placed on the top exterior portion of a particular vehicle component, such as an air intake system. The lid may have certain structural characteristics which provide for aesthetic features, such as colors or various other designs, to be subject to varying degrees of user customization. On the underside of the lid covering may be additional customizable components which provide for even greater user customization of the aesthetic appearance of various vehicle components. For example, various colors and designs may be placed on the exterior of the vehicle component, with the lid acting so as to safely and securely cover the customizable components.

11 Claims, 5 Drawing Sheets

PERSONALIZED PRODUCT MODIFICATION

This application claims the benefit of U.S. Provisional Application No. 62/751,087, entitled PERSONALIZED PRODUCT MODIFICATION, filed Oct. 26, 2018, which is fully incorporated herein by reference.

TECHNICAL FIELD

The present invention relates to the field of vehicles and vehicle customization. More specifically, the present invention relates to an apparatus and method of customizing a vehicle with regards to certain functional and performance components, for example the air intake system, in such a manner so as to provide the vehicle with a more personalized appearance.

BACKGROUND

It is common among vehicle owners to wish to customize their vehicle to the furthest extent possible. Among those customizations common in the auto industry include color schemes, which may be reflected in certain aspects such as the paint color of the vehicle itself, to the color of the wheels, to the interior color, as well as a number of additional features which may be subject to color manipulation. Various other types of aesthetic manipulations are possible, including various types of textures and designs, which may be incorporated into any different number of vehicle parts or components.

As such, many vehicles have a series of functional or performance components located under the hood or in the engine bay which may be subject to certain levels of customization. For example, a common feature in many vehicles, most notably that of performance vehicles, is an air intake system which is prominently displayed in the engine bay of the vehicle when the hood of the vehicle is raised. To date, air intake systems common in the auto industry focus on the performance aspects of the component. This has thus resulted in what appears to be a neglect of the aesthetic appearance of such components. It is not uncommon for air systems of vehicles to consist of nothing more than a flat black outer plastic covering, with the exception of certain other minor features, such as a series of bolts or screws to hold system in place, or possibly a manufacturer's name or logo printed thereon.

The present disclosure seeks to address this need for additional aesthetic customization of certain vehicle components, including that of air intake systems, by providing a means of customizing the appearance of such components, including such features as the color, design, and overall appearance.

SUMMARY

An apparatus and method for personalized product modification is disclosed. The personalized product modification may be applied to various different types of vehicle components. For example, a lid covering may be placed on the top exterior portion of a particular vehicle component, such as an air intake system. The lid may have certain structural characteristics which provide for aesthetic features, such as colors or various other designs, to be subject to varying degrees of user customization. On the underside of the lid covering may be additional customizable components which provide for even greater user customization of the aesthetic appearance of various vehicle components. For example, various colors and designs may be placed on the exterior of the vehicle component, with the lid acting so as to safely and securely cover the customizable components.

Other benefits and advantages of the present disclosure will become apparent to those skilled in the art to which it pertains upon reading and understanding of the following detailed specification.

BRIEF DESCRIPTIONS OF THE DRAWINGS

The disclosed article and method for making same, and corresponding methods and systems may take physical form in certain parts and arrangement of parts, embodiments of which will be described in detail in this specification and illustrated in the accompanying drawings which form a part hereof and wherein.

DETAILED DESCRIPTION

The present disclosure relates to an apparatus and method of customizing various components of a vehicle. It should be appreciated that the present disclosure may be broadly applied to any different number of vehicle components, including those located both under the hood, as well as in the interior of the vehicle or on the exterior of the vehicle. While the present disclosure may at times refer to an air intake system as the particular vehicle component being discussed, such use is for illustrative purposes only, and is not meant to restrict the application of the present disclosure to only that of an air intake system.

Figure 1:
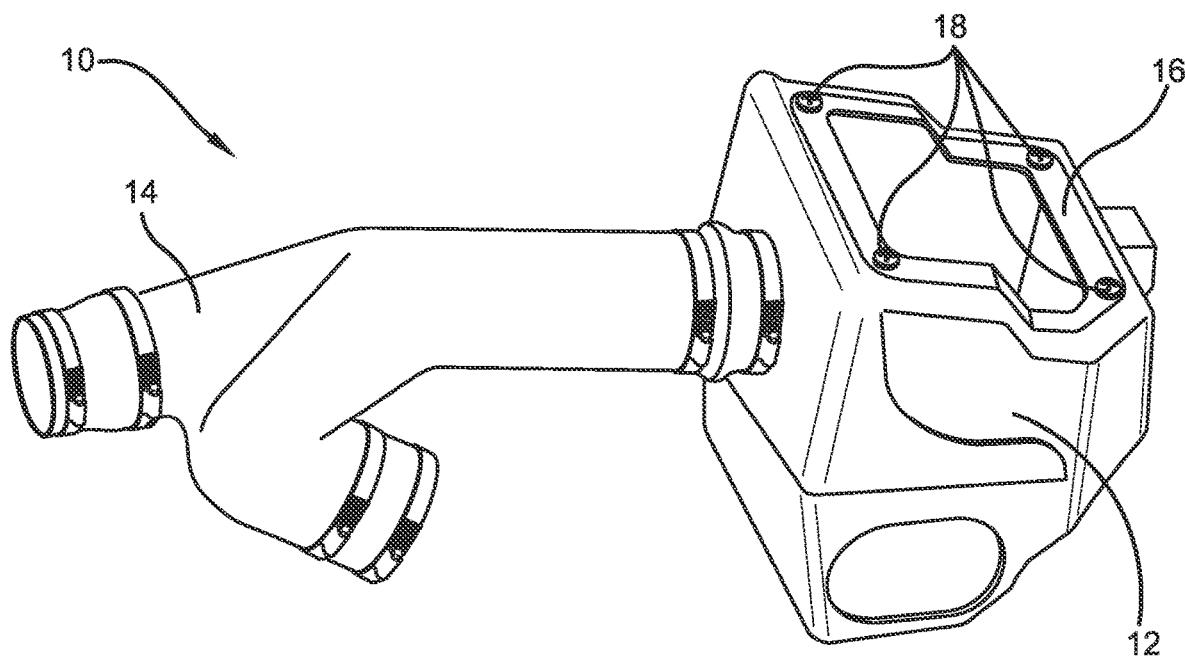
FIG. 1 is a perspective view of an air intake system which may be installed on a vehicle.

With reference now to FIG. 1, an air intake system 10 may be seen. The air intake system 10 may be further defined by having a central housing 12, from which a longitudinal piping 14 extends therefrom. The central housing 12 may act as a covering for a series of functional components located thereunder which contribute to the overall performance of the vehicle. While the embodiment represented in FIG. 1 is that of an air intake system, it should be appreciated that a number of additional vehicle performance components may have a similar housing structure which acts so as to cover the internal workings of the particular component. Thus, the air intake system 10 is but one illustration of such a component covering which may be further subject to the manipulation and customization discussed throughout the present disclosure.

With continued reference to FIG. 1, the central housing 12 may have a mounting bracket 16 located on the top portion thereof. An aperture is located in a top portion of the central housing, having a shape sized according to contours of the central housing. The mounting bracket 16, according to the embodiment shown in FIG. 1, is substantially, rectangular in shape, according to the specific contours of the central housing 12 upon which it is affixed. The mounting bracket 16 defines a perimeter of the aperture. Various different shapes and sizes of mounting brackets may be used according to the specific vehicle component being customized. The mounting bracket 16 includes structures, placed about the various four corners of the mounting bracket 16 of the air intake system 12 shown in FIG. 1, for enabling engagement with fasteners, such as a series of four mounting screws 18. The mounting screws 18 may be positioned about the relative four corners of the mounting bracket 16. While the mounting screws 18 shown in FIG. 1 are that of typical screws as are associated with traditional means of securement, it is to be appreciated that any different number of similar securement means or devices may be similarly used as identified by those having skill in the art without deviating from the present disclosure. The combination of the mounting bracket 16 and the mounting screws 18 may allow for various additional components to be mounted to the exterior portion of the central housing 12.

Figure 2:
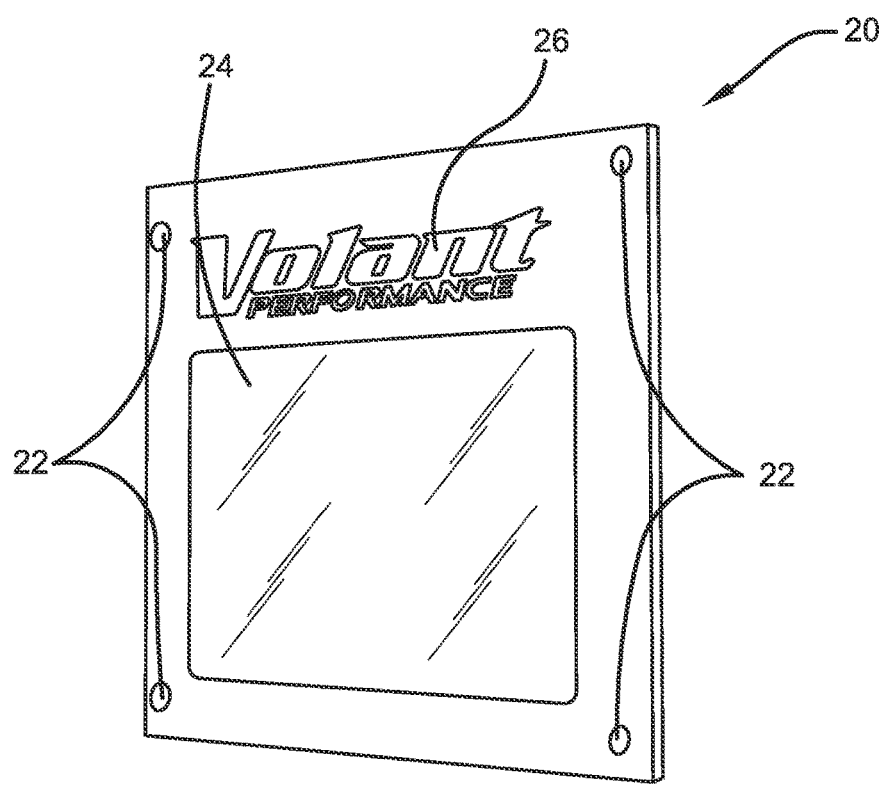
FIG. 2 is a top view of a lid which may be placed on the exterior of a vehicle component.

With reference now to FIG. 2, a lid component 20 is shown. The lid component 20 shown in FIG. 2 is substantially rectangular in nature, being defined by having four sides. The lid component 20 is provided for placement on an exterior of the central housing 12, for substantially covering the aperture. Positioned about each of the four sides of the lid component 20 are that of receiving slots 22, capable of receiving a screw, bolt, or any other type of fastener as is commonly used in the art. According to the embodiment shown in FIG. 2, the receiving slots 22 are substantially circular in nature. Positioned about the relative center of the lid 20 is that of a viewing panel 24. The viewing panel 24 is defined by a transparent or semi-transparent pane which permits light to pass through, thereby exposing a visual representation of that material located on the underside thereof. According to the embodiment shown in FIG. 2, the viewing panel 24 is of a generally rectangular nature, following the general contours of the lid 20. The edges of the viewing panel 24 may be smoothed or otherwise rounded for various reasons, such as the creation of a more pleasing aesthetic appearance. The transparent or semi-transparent nature of the viewing panel 24 may further extend about the face of the lid 20. For example, a design portion 26 may be present on the face of the lid 20, positioned on either side relative to that of the viewing panel 24. According to the embodiment shown in FIG. 2, the design 26 may consist of a product manufacturer or other related name or logo. The transparent or semi-transparent nature of the design 26 allows for similar viewing capabilities as discussed with regards to the viewing panel 24. Thus, by placing certain materials on the underside of the lid relative to the location of the design 26, certain aesthetic features may be seen.

The lid component 20 can be formed of a transparent or semi-transparent material having a covered area with a coating of an opaque material, leaving transparent or semi-transparent void areas for the viewing panel 24 and design portion 26. The opaque material can be paint or ink or other suitable material, and can be applied to the lid component 20 through a stencil or silk screen process. Alternatively, the opaque material can be a metallic or other suitable material applied using a deposition process. The opaque material is preferably applied to the underside of the lid component 20, to provide protection against abrasion due to scuffing, handling, etc. Still further, instead of coating with an opaque material, the covered area can be formed of a textured surface obtained through etching or sandblasting or the like.

Figure 3:
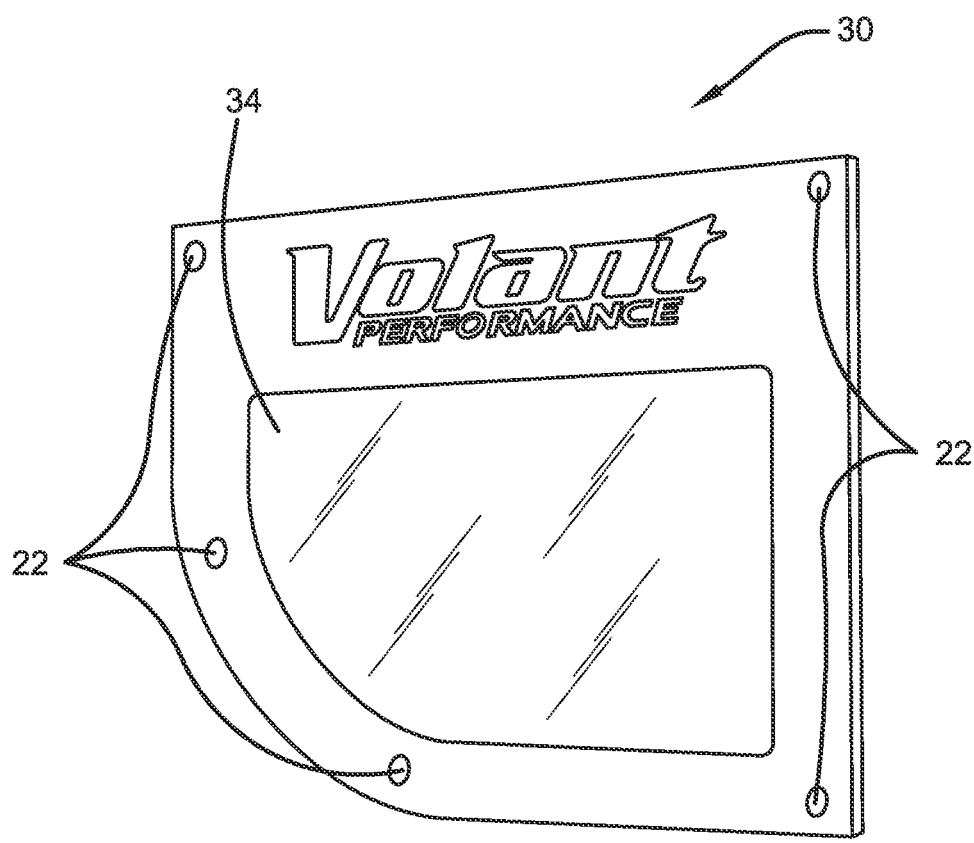
FIG. 3 is a top view of an alternative design of a lid may be placed on the exterior of a vehicle component.

With reference now to FIG. 3, an alternative design of a lid 30 is shown. The lid 30 of FIG. 3 illustrates that a lid to be used in conjunction with a vehicle component may take the form of any different number of geometric representations, according to that specific vehicle component which is to be covered. The lid 30 shown in the embodiment of FIG. 3 has a substantially rectangular shape, with one of the edges having an extreme rounding, or chamfering, such that it presents an arc-like appearance. The lid 30 is accompanied by a series of receiving slots 32, with the receiving slots 32 being positioned about the exterior of the lid 30 in such a manner so as to ensure a secure connection to that of the corresponding mounting bracket on the vehicle component. The lid 30 also contains a viewing panel 34, defined by its transparent or semi-transparent pane located in substantially the center thereof, permitting much the same viewing features as described with reference to the viewing panel 24 of FIG. 2 above. As two different types of lid components (20 and 30) have been disclosed as a way of illustrating the variability of such a component, the remainder of the present disclosure, for ease of reference, will make reference primarily to that of the lid 20 as shown in FIG. 2, though it is to be understood that any such features described with reference thereto are of equal applicability and functionality with that of the lid 30, in addition to any other lids or similar components used therewith.

Figure 4:
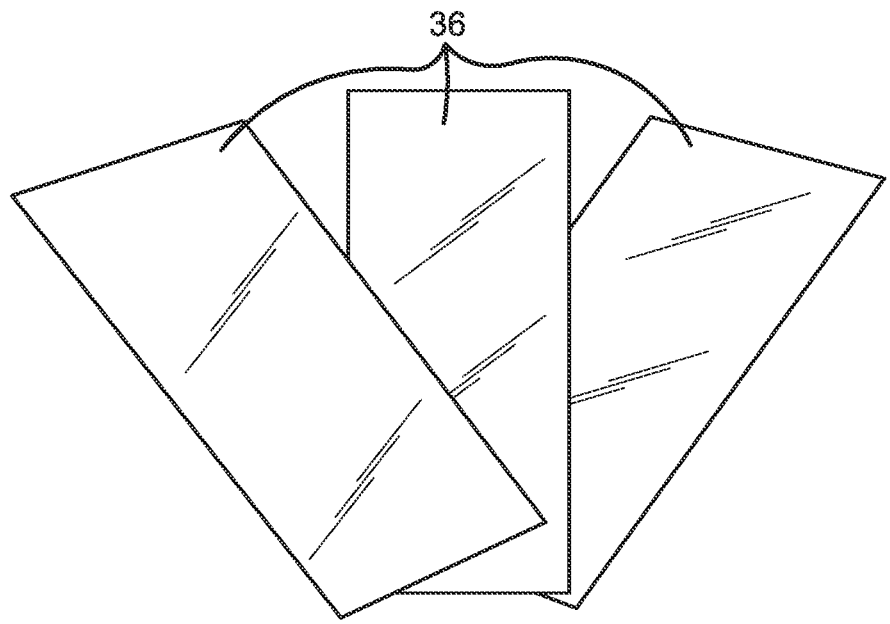
FIG. 4 is a top view of a series of customization inserts which may be mounted on the underside of the lid.

With reference now to FIG. 4, a series of customizable inserts 36 are shown. The customizable inserts 36 may take the form of any different number of geometric shapes or varying dimensions as is required according to the size and contours of the vehicle component with which they will be coupled. According to the embodiment shown in FIG. 4, the customizable inserts 36 are rectangular in nature. The customizable inserts 36 may further incorporate any different number of color schemes, designs, or other various aesthetic features. Additional features of the customizable inserts 36 may include certain properties which help to aid the inserts 36 in being coupled to the lid 20. For example, the customizable inserts 36 may have an adhesive affixed to one side, allowing the insert to be coupled directly to the lid 20. Other means of coupling may include the use of an industrial glue or other type of coupling agent, a hook and loop fastener, two-sided tape of sufficient strength, or any other coupling means as recognized by those having skill in the art.

Figure 5:
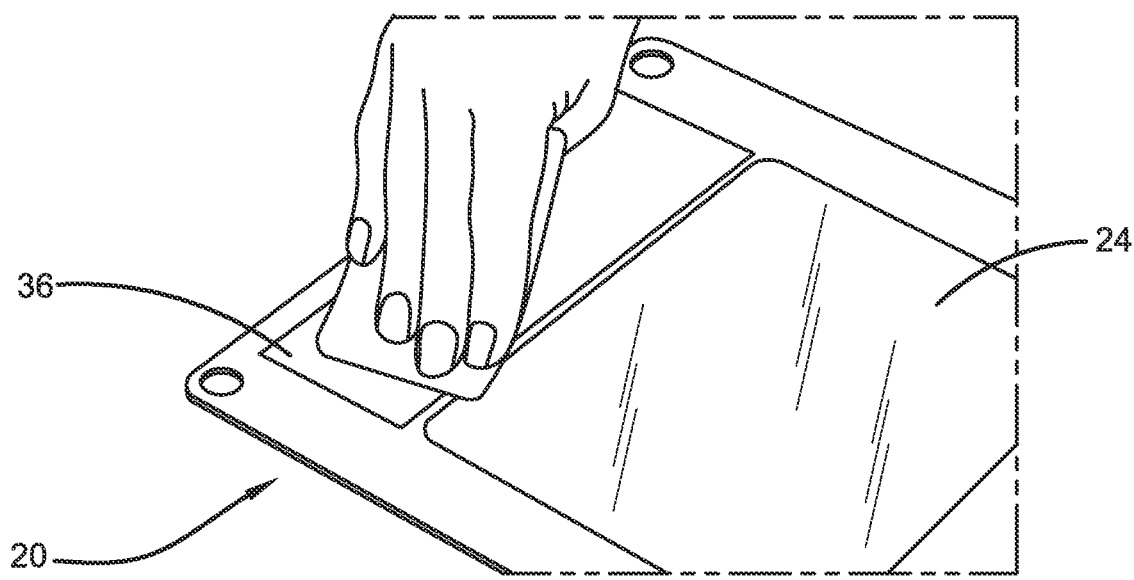
FIG. 5 is a reverse view of a lid showing a customization insert being applied thereto.

FIG. 5 shows a lid 20 pictured from the reverse, or back, side. On the reverse side of the viewing panel 24, a customizable insert 36 is shown being coupled thereto by way of an adhesive strip. As will be appreciated with reference to the remaining Figures, by affixing the customizable inserts 36 in such a manner, any aesthetically pleasing portions of the inserts 36 may thereby be viewed through the viewing panel 24 according to the transparent or semi-transparent nature thereof.

Figure 6:
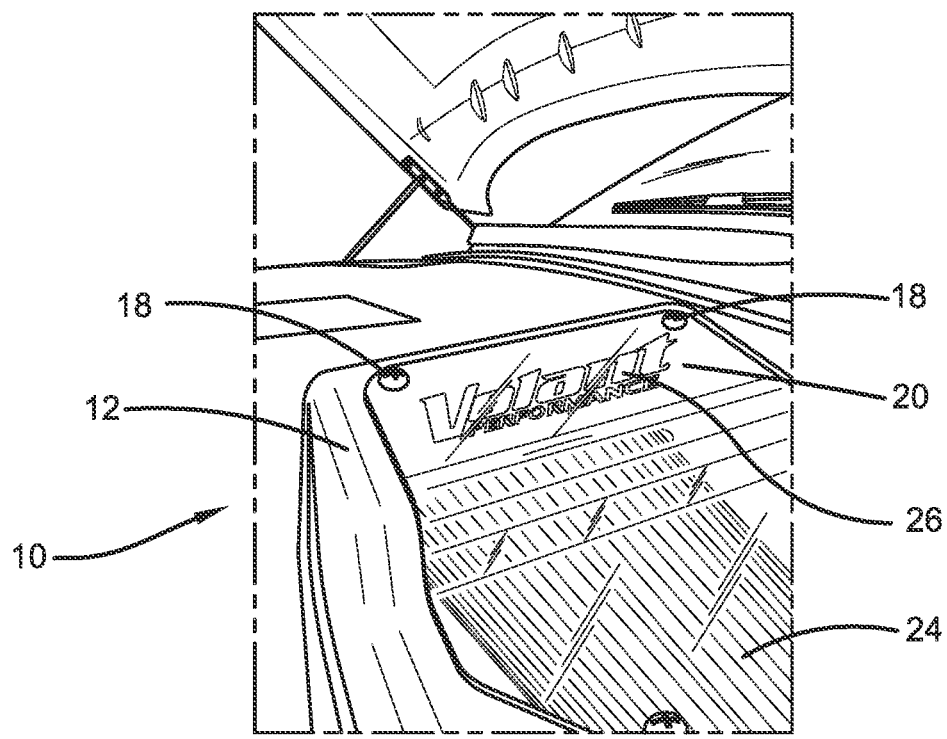
FIG. 6 is a perspective view of a lid mounted on a vehicle component, having at least one customization insert mounted thereon.

With reference now to FIG. 6, an air intake system 10 is shown as mounted on an associated vehicle and with the personalized product modification configuration affixed thereto. The central housing 12 of the air intake system 10 can be seen with an associated lid 20 mounted thereto. The lid 20 is secured to the mounting bracket 16 of the central housing 12 by way of a series of mounting screws 18. The viewing panel 24 of the lid 20 allows for the customizable inserts 36 to be viewed. The customizable inserts 36 as viewed through the viewing panel 24 shown in FIG. 6 are of a striped, textured design, while also incorporating a color scheme. The particular color of the customizable inserts 36 may be chosen by the user according to their own personalization desires. For example, the color of the inserts 36 may match that of the exterior paint of the vehicle. Other examples may allow for the inserts 36 to match the color of the interior of the vehicle, various other component parts of the vehicle, or may simply be of a particular design and color scheme which the vehicle owner finds appealing, sharing no relation to that of the vehicle itself.

With continued reference to FIG. 6, the design 26 of the lid 20 is backed by a series of customizable inserts 36 which results in a three-tiered color scheme to be visible through the transparent nature thereof. The customizable inserts 36 shown in FIG. 6 with regards to the design 26 may take the form of a series of individual inserts which result in the desired aesthetic appearance of three different colors, or may alternatively be produced by a single insert being of such a three-colored nature. The position of the air intake system 10 is along the right side, rear portion of the engine bay of the associated vehicle. While this corresponds to the location of the particular air intake system 10 for which the configuration of FIG. 6 is concerned, those having skill in the art will appreciate that such placement is not a requirement of the present disclosure; rather, the product modification of the present disclosure may be used in combination with any different number of vehicle components which may be placed at any different number of locations, either within the engine bay, or located elsewhere on the associated vehicle.

Figure 7:
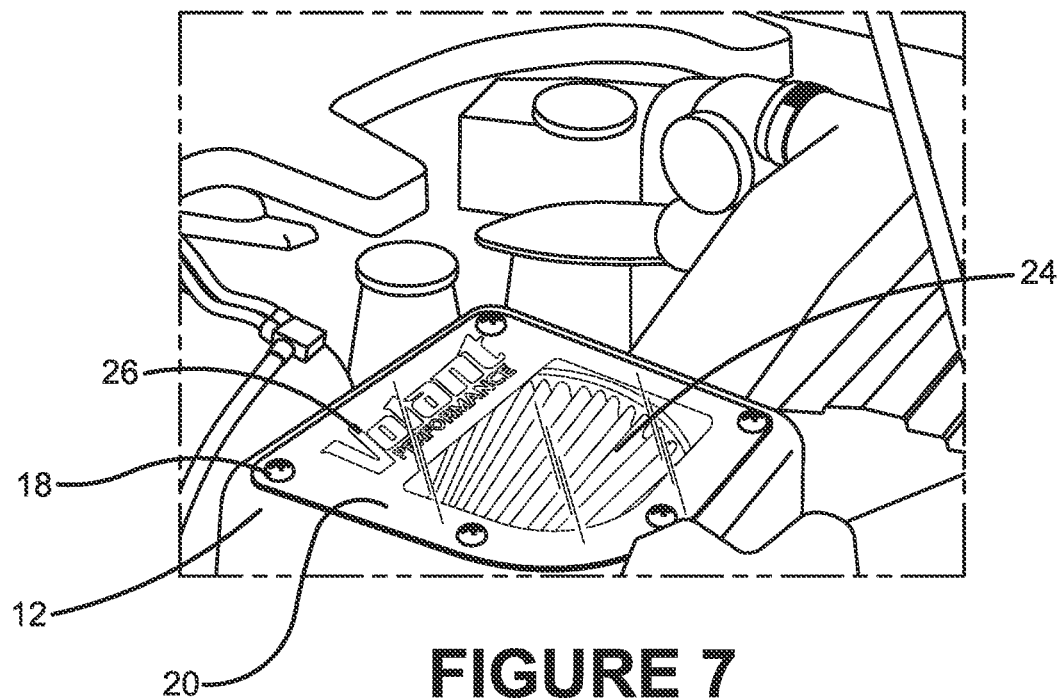
FIG. 7 is an alternative view of a lid mounted on a vehicle component, having at least one customization insert mounted thereon.

With reference now to FIG. 7, an alternative design configuration is shown wherein the viewing panel 24 of the lid 20 portrays an alternative aesthetic design. In a similar manner to that discussed above with regards to FIG. 6, the lid 20 as shown in FIG. 7 is affixed to the central housing 12 of the air intake system 10 by way of the mounting bracket 16. A series of mounting screws 18 are used so as to ensure a secured attachment thereto. Placed between that of the mounting bracket 16 and the lid 20 of FIG. 7 is at least one customizable insert 36, which may be viewed through the transparent or semi-transparent viewing panel 24. The customizable insert 36 as shown in FIG. 7 is of a textured design, having a color component as may be selected by the owner of the vehicle. The configuration shown in FIG. 7 differs from that as shown in FIG. 6 in that the FIG. 7 configuration does not contain additional customizable inserts placed at a location corresponding to that of the design 26 of the lid 20. This configuration thus results in the design 26, while still being of a transparent or semi-transparent nature, allowing for the surface of the mounting bracket 16 to be viewed. The design 26 of the lid 20 may have a further color component to it, based upon the construction of the design itself, which may result in a smoked or slightly colored appearance; however, such an appearance is to be differentiated from that of the colored or textured appearance created by the presence of a customizable insert 36 placed between that of the lid 20 and the mounting bracket 16.

Figure 8:
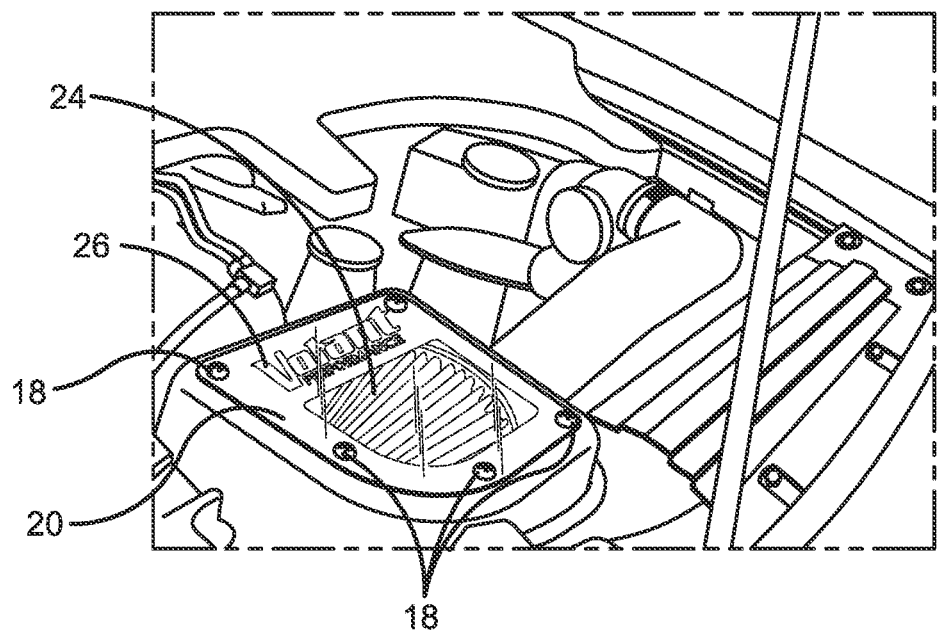
FIG. 8 is another alternative view of a lid mounted on a vehicle component, having at least one customization insert mounted thereon.

With reference now to FIG. 8, another alternative design configuration is shown wherein the viewing panel 24 of the lid 20 portrays an alternative aesthetic design. In a similar manner to that discussed above with regards to both FIGS. 6 and 7, the lid 20 as shown in FIG. 8 is affixed to the central housing 12 of the air intake system 10 by way of the mounting bracket 16. A series of mounting screws 18 are used so as to ensure a secured attachment thereto. The lid as shown in FIG. 8 is that of the alternative design of the lid, or lid 30, as is described with reference to FIG. 3 above. This alternative design configuration thus illustrates that the personalized product modification of the present disclosure is capable of being used in accordance with any different number of lid designs or configurations, as well as any different number of vehicle components. The personalized product modification shown in FIG. 8 is associated with an air intake system 10 which is positioned about the left, front portion of the associated vehicle, thus further illustrating that the product modification is neither restricted nor limited to any particular location of the corresponding vehicle component sought to be customized.

Figure 9:
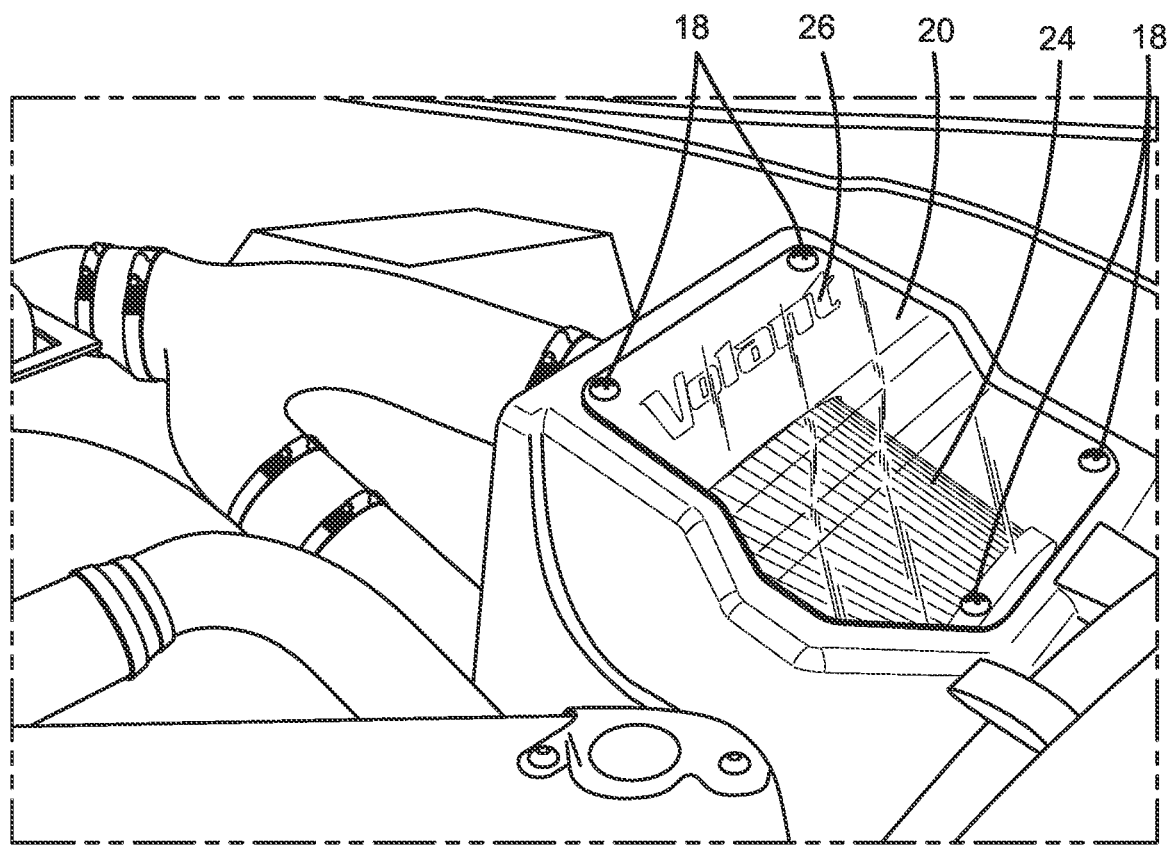
FIG. 9 is another alternative view of a lid mounted on a vehicle component, having at least one customization insert mounted thereon.

With reference now to FIG. 9, an alternative view of the personalized product modification of the present disclosure may be seen. Similar to those views as illustrated in the above-referenced Figures, the configuration of FIG. 9 uses a series of securement screws 18 in order to affix the lid 20 to that of the mounting bracket 16 of the central housing 12 of the air intake system 10.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof. The phrase "associated with" as used in this document, refers to structures which support the disclosed device and may also refer to structures not disclosed herein capable of supporting the disclosed device. Further, the "invention" as that term is used in this document is what is claimed in the claims of this document. The right to claim elements and/or sub-combinations that are disclosed herein as other inventions in other patent documents is hereby unconditionally reserved.

What is claimed:
1. A customized vehicle component, comprising:
a central housing for covering a functional component located thereunder which contributes to overall performance of a vehicle;
an aperture, located in a top portion of the central housing, having a shape sized according to contours of the central housing;
a mounting bracket, located on a top portion of the central housing, defining a perimeter of the aperture, the mounting bracket having structures for enabling engagement with fasteners;
a lid component for placement on an exterior of the central housing, for substantially, covering the aperture, the lid component comprising:
receiving slots around a perimeter of the lid component for receiving the fasteners for securing the lid component to the mounting bracket;
a viewing panel defined by an at least semi-transparent pane which permits at least a portion of light to pass through, thereby exposing the functional component;
a design portion positioned on a side of the viewing panel, the design portion being at least semi-transparent to permit at least a portion of the light to pass through; and
at least one customizable insert having at least one aesthetic feature, the at least one customizable insert being coupled to an underside of the design portion with a coupling so that the at least one aesthetic feature is viewed through the at least semi-transparent design.

2. The customized vehicle component of claim 1, wherein the functional component is an air intake system and wherein the central housing comprises a longitudinal piping.

3. The customized vehicle component of claim 1, wherein the fasteners are mounting screws.

4. The customized vehicle component of claim 1, wherein the viewing panel is positioned about a relative center of the lid component.

5. The customized vehicle component of claim 1, wherein the viewing panel and the design portion are transparent to allow the light to pass through.

6. The customized vehicle component of claim 1, wherein the design portion comprises a color component resulting in a smoked or slightly colored appearance differentiated from the at least one aesthetic feature of the customizable insert.

7. The customized vehicle component of claim 1, wherein the design portion comprises at least one of a name or a logo of a product manufacturer.

8. The customized vehicle component of claim 1, wherein the at least one aesthetic feature of the customizable insert comprises at least one of a color scheme, a texture, or striped design.

9. The customized vehicle component of claim 1, wherein the coupling comprises an adhesive affixed to one side of the customizable insert, allowing the customizable insert to be coupled directly to the underside of the lid component.

10. The customized vehicle component of claim 1, wherein the coupling comprises at least one of an industrial glue, a hook and loop fastener, or two-sided tape of sufficient strength.

11. The customized vehicle component of claim 1, wherein at least one customizable insert comprises a series of customizable inserts, each having a different aesthetic feature.

* * * * *